April 24, 1956

W. L. GREGORY ET AL 2,743,324

AMPLIFIER ATTENUATORS

Filed May 23, 1952

Inventor
William L. Gregory
Frank C. Holmes
By Emery Holcombe & Blair
Attorney

United States Patent Office 2,743,324

Patented Apr. 24, 1956

2,743,324

AMPLIFIER ATTENUATORS

William Langdale Gregory and Frank Cecil Holmes, Cambridge, England, assignors to Pye Limited, Cambridge, England, a British company Application May 23, 1952, Serial No. 289,532

Claims priority, application Great Britain May 28, 1951

1 Claim. (Cl. 179—171)

This invention relates to an arrangement for the remote control of the gain of electronic amplifiers, particularly wide-band amplifiers.

It is sometimes required to attenuate the gain of an amplifier in steps under conditions where the attenuating switch or control is most conveniently situated at a point remote from the amplifier chassis. This is particularly the case when groups of matched amplifiers consisting of a number of wide-band amplifiers are required to be step-attentuated simultaneously, and difficulty is encountered in the ganging of the switch spindles of the attenuators associated with each amplifier.

The present invention consists in an arrangement for the remote control of the gain of an electronic amplifier, wherein the amplifier includes a valve arranged as a cathode follower stage and having an attenuator network connected to its cathode, so that when the cathode follower is conducting it passes a signal which is fed to its input without substantial attenuation, and when the cathode follower is non-conducting the signal is attenuated according to the characteristic of the attenuator network, switch means being provided for rendering said valve conductive or non-conductive.

Preferably the cathode follower is normally conducting and is rendered non-conducting by applying a positive voltage to its cathode, this positive voltage being derived from the H. T. positive supply to the valve through a resistor, which is connected in circuit by means of a switch located at the remote control point.

A step-attenuator may be provided by including two or more attenuator stages according to this invention in an amplifier, for example, so that each cathode follower interconnects two successive stages of the amplifier. The attenuation may be effected in steps by successively rendering each cathode follower non-conducting, thereby reducing the gain of the amplifier in corresponding steps.

An embodiment of the invention will now be described with reference to the accompanying drawing, in which.

Figure 1:
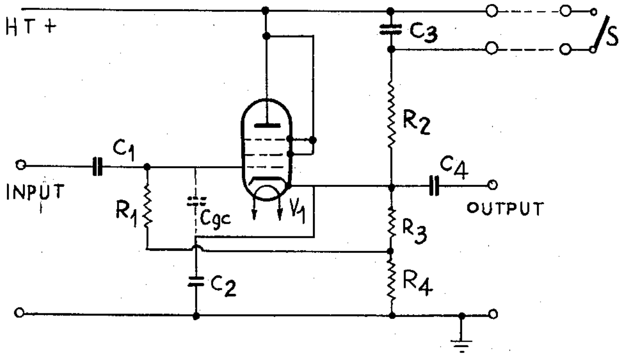
Fig. 1 shows a cathode follower attenuator circuit according to the invention.

Referring to Fig. 1, the valve V1 is connected as a conventional cathode follower stage, having its anode connected to the H. T. positive supply line and a cathode load comprising resistors R3 and R4, connected between its cathode and earth. A resistor R1 is connected between the grid of valve V1 and the junction of resistors R3 and R4. The cathode of the valve is also connected to the H. T. positive line through a resistor R2 connected in series with a condenser C3. A switch S situated at a point remote from the cathode follower has its contacts connected across the condenser C3 so that, when this switch is open, the cathode of the valve 1 is isolated from the H. T. positive supply by the condenser C3, and the valve conducts, and when the switch is closed the cathode of the valve 1 is biassed positively and the valve is rendered nonconducting.

Figure 2:
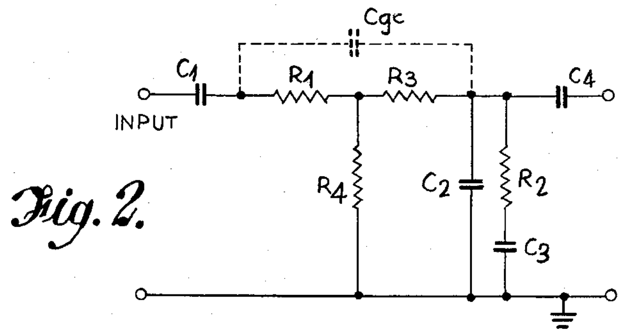
Fig. 2 shows the effective attenuator network when the cathode follower is non-conducting.

The output of a previous amplifier stage is fed via a condenser C1 to the grid of the valve 1, the output of this valve being applied to the next amplifier stage via a condenser C4. Thus, whilst the cathode follower is conducting, up to approximately 0.95 of the input voltage to the grid is applied to the following stage of the amplifier and the input signal is only very slightly attenuated. When the switch S is closed however a sufficient voltage is developed across R3 to bias the valve V1 to cut-off, and the attenuator circuit becomes effective, the equivalent circuit being shown in Fig. 2. The condenser C3 is a decoupling condenser, and its value is chosen so that its impedance is negligible at the required pass band of the amplifier. Condenser C2 is provided to compensate for the higher frequency lift resulting from the grid-cathode capacity $C_{gc}$ shunting the resistors R1 and R3.

Attenuation of from 10–30 decibels may be achieved by suitable values of the resistors R1 and R4 in conjunction with the resistors R3 and R2 which will have been chosen on consideration of the bias requirements of the valve VI. This attenuation range will be modified in practice however by frequency pass-band considerations.

The stability of attenuation factor of the arrangement according to this invention, remains independent of the characteristics of the valve, since the latter is non-conducting when attenuation is required.

Figures 3, 4:
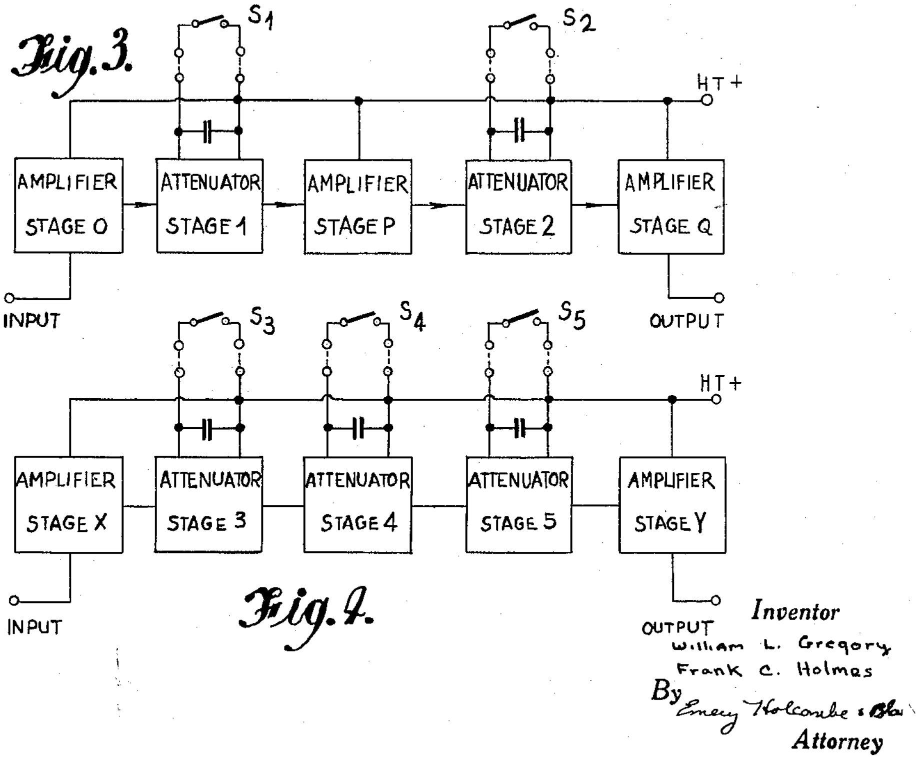
Figs. 3 and 4 show block diagrams of amplifier circuits incorporating attenuator circuits according to the invention.

By providing several attenuator stages as described, connected between successive stages of the amplifier, the amplifier may be attenuated in steps by successively rendering the cathode followers non-conducting. One such arrangement is shown in Fig. 3 where successive stages O, P and Q of an amplifier are interconnected by means of attenuator stages 1 and 2, which are constructed as shown in Fig. 1. The attenuator stages 1 and 2 are respectively controlled by means of switches $S_1$ and $S_2$ which are preferably located at a point remote from the amplifier. When either of these switches is closed, the associated valve in the attenuator stage is rendered non-conducting to bring the attenuator into operation. Full attenuation is achieved with both switches closed.

An alternative arrangement is shown in Fig. 4, wherein three attenuator stages 3, 4, and 5 which are each constructed as shown in Fig. 1, are connected in series between two successive amplifier stages X and Y. In this arrangement the attenuator stages 3, 4 and 5 are respectively rendered non-conducting by closing switches $S_3$, $S_4$ and $S_5$ which are preferably located remote from the amplifier. Each of these switches is connected between the high tension positive supply line and the cathode circuit of the cathode follower valve in the appropriate attenuator stage, so that when a switch is closed, a positive voltage is applied to the cathode of the valve to render it non-conducting. This arrangement gives three steps of attenuation between the amplifier stages X and Y. Furthermore with the arrangement described, the gain of several amplifier channels may be simultaneously controlled in unison from a remote point without any complicated ganging of switches.

The attenuation is further controlled from a remote point without any of the leads between the attenuator and the remote point forming part of the actual attenuator circuit.

Whilst a particular embodiment has been described, it will be understood that various modifications may be made without departing from the scope of the invention. For example instead of rendering the cathode follower non-conducting by applying a positive voltage to its cathode, this may be achieved by applying a negative potential to the control grid, or where the time for cooling and heating of the valve cathode can be tolerated, by simply switching off the valve heater.

We claim:

A step-attenuator comprising a plurality of electronic valves each connected as a cathode follower circuit and each having an anode, a cathode and at least one grid electrode, a plurality of attenuator networks equal to the number of electronic valves, each attenuator network being respectively connected between the cathode of one electronic valve and a point of fixed potential, connection between each attenuator network and said at least one grid electrode of the valve associated with that attenuator network, a source of high-tension positive supply, means connecting the anodes of each of said valves to said source of said high-tension positive supply, means interconnecting said plurality of electronic valves with the cathode of one valve connected to said at least one grid electrode of a subsequent valve, means for feeding an input signal to said at least one grid electrode of the first valve, means for deriving an output signal from the cathode of the last valve, and switch means associated with each of said electronic valves for selectively rendering each of said valves conducting and non-conducting.

References Cited in the file of this patent

UNITED STATES PATENTS

| | | |
|---|---|---|
| 2,073,458 | Silent | May 9, 1937 |
| 2,200,055 | Burnett | May 7, 1940 |
| 2,515,111 | Buchholzer et al. | July 11, 1950 |
| 2,596,138 | Feiner | May 13, 1952 |

FOREIGN PATENTS

| | | |
|---|---|---|
| 526,499 | Great Britain | Sept. 19, 1940 |